United States Patent
Koomen et al.

(10) Patent No.: US 7,426,798 B2
(45) Date of Patent: Sep. 23, 2008

(54) APPLICATIONS OF ELECTRONIC AND PAPER SIGNS

(75) Inventors: Johannes A. Koomen, Avon, NY (US); Michael H. Wang, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 579 days.

(21) Appl. No.: 11/165,664

(22) Filed: Jun. 24, 2005

(65) Prior Publication Data
US 2007/0025303 A1    Feb. 1, 2007

(51) Int. Cl.
G09F 7/00    (2006.01)
(52) U.S. Cl. ......................... 40/584; 340/5.91
(58) Field of Classification Search ................ 340/5.91; 40/584
See application file for complete search history.

(56) References Cited

U.S. PATENT DOCUMENTS

| | | | |
|---|---|---|---|
| 4,126,854 A | 11/1978 | Sheridon | |
| 4,821,029 A | 4/1989 | Logan et al. | |
| 5,448,226 A * | 9/1995 | Failing et al. | 340/5.91 |
| 5,473,146 A | 12/1995 | Goodwin, III | |
| 5,604,027 A | 2/1997 | Sheridon | |
| 5,717,514 A | 2/1998 | Sheridon | |
| 5,815,306 A | 9/1998 | Sheridon et al. | |
| 5,825,529 A | 10/1998 | Crowley | |
| 5,854,474 A | 12/1998 | Goodwin, III | |
| 6,019,466 A | 2/2000 | Hermanson | |
| 6,550,673 B2 * | 4/2003 | Massaro | 235/383 |
| 6,552,663 B2 * | 4/2003 | Swartzel et al. | 340/572.1 |
| 6,573,880 B1 | 6/2003 | Simoni et al. | |
| 6,897,763 B2 * | 5/2005 | Schulmerich et al. | 340/5.91 |
| 2002/0165779 A1 | 11/2002 | Goodwin, III et al. | |
| 2005/0008829 A1 * | 1/2005 | Suits | 428/195.1 |
| 2005/0030158 A1 * | 2/2005 | Schulmerich et al. | 340/5.91 |

* cited by examiner

*Primary Examiner*—Gary C Hoge
(74) *Attorney, Agent, or Firm*—Pepper Hamilton LLP

(57) ABSTRACT

A method and system for creating, updating, and displaying content on a plurality of paper and electronic signs is disclosed. A server receives and transmits content information that is associated with particular merchandise for the signs. The server transmits data for new signs and updates old signs automatically, either by directly changing the electronic display device, or by printing a new paper sign to a corresponding printer or CPU.

18 Claims, 5 Drawing Sheets

APPLICATIONS OF ELECTRONIC AND PAPER SIGNS

TECHNICAL FIELD

The disclosed embodiments generally relate to methods and systems in which content can be created, modified, and displayed on one or more paper and/or electronic signs in remote locations.

BACKGROUND

Signs are often displayed in retail organizations to provide information such as a type of good for sale and the price of the good. Conventional signs are typically paper-based and static, and are often distributed electronically to individual stores from a remote location, such as corporate headquarters. Individual stores must then print the signs and display them in the appropriate paper sign holders. Accordingly, in order to reflect updated information, the existing sign displaying the old information must be replaced with a new sign that contains the updated information. A store associate must physically locate the appropriate sign located at a particular product display, or alternatively, locate the appropriate product when looking at the paper sign.

Replacing such signs throughout a store can require a significant number of man-hours depending upon the size of the facility and the frequency with which information is updated. This may require numerous individuals dedicated to the task of replacing signs throughout even a single facility, and retail organizations often dedicate large numbers of personnel to this process. This is, of course, magnified when a single enterprise has multiple facilities, as not only are more signs needed to be replaced, but there are significant logistical issues with delivering new signs to multiple locations. Moreover, when item descriptions and prices are changed manually, there is no assurance that the price displayed adjacent an item is the correct price, or even corresponds to the correct item.

An existing method of updating retail signs is described in U.S. Pat. No. 5,473,146, to Goodwin, the disclosure of which is entirely incorporated herein by reference. However, this and other prior art methods require separate computer or systems to be located at the point of sale, and they do not provide an adequate ability to display several types of information on a single sign. They also do not allow for sign data to be stored and sent from corporate headquarters to merchandise display locations at a plurality of individual retail store locations, nor do they integrate the transmission of sign data for products that do not yet utilize an electronic display device with the transmission of sign data for products that are connected with electronic signs.

Currently, some retail organizations are implementing a signage practice based on electronic sign displays, whereby the administration and management of signs is accomplished by interfacing the network of signs with a server computer. The administration and management of the network of signs may be accomplished by a user interface, or pursuant to a set of instructions previously provided to the server computer. Each sign is notified by the server computer to retrieve the new content to be displayed on the sign and to gather local information and return it to the server. The server may also construct new content and instruct the sign to retrieve and display new or different content. The implementation of this signage practice based on electronic sign displays is likely to require a period of time during which the technology and the equipment is introduced gradually. This will require that both the existing paper-based sign process and the new electronic sign based process be used simultaneously, and there is therefore a need for a rational and reliable method for integrating the two processes.

The present disclosure describes attempts to solve one or more of the above-listed problems.

SUMMARY

An embodiment involves a system for managing a network of electronic and paper signs, including an on-site processor in communication with a central processor, at least one electronic display device and at least one printer. The on-site processor implements program instructions to perform operations such as: (1) receiving, from the central processor, sign data; (2) determining whether the sign data corresponds to an electronic display device, a paper sign, or both; (3) if the data corresponds to an electronic sign, updating the corresponding electronic display device; and (4) if the data corresponds to a paper sign, printing a corresponding paper sign on at least one of the printers. The sign data may include, but is not limited to, one or more of the following: (1) a sign type; (2) sign wording; (3) at least one retail store; (4) at least one department within a retail store; (5) a unique identifier associated with the product associated with the sign; (6) a date or dates that a sign should be displayed; (7) a time or times when a sign should be displayed; (8) a unique identifier associated with the sign.

Optionally, the on-site processor may store information about each electronic and paper sign. Such information may include, for example, one or more of the following: (1) store identification; (2) sign location; (3) physical dimensions; (4) sign format; (5) paper sign identification; and (6) printer identification. The corresponding electronic display device may optionally include a wired or a wireless communication device, where the on-site processor may communicate with the corresponding display device via the wired or wireless communication device. The system may also include a portable input that transmits to the on-site processor a first identifier associated with one or more products and a second identifier associated with the paper sign.

In another embodiment, a method of managing content includes the following steps: (1) creating electronic sign data pertaining to an electronic sign and a product identifiable by an identifier; (2) creating paper sign data pertaining to a paper sign and a product identifiable by an identifier; (3) transmitting at least a portion of the electronic sign data and at least a portion of the paper sign data to an on-site processor, where the on-site processor is operably connected to an electronic sign and operably connected to a printer associated with a paper sign; (4) and displaying the electronic sign data on the electronic sign and the paper sign data on the paper sign. Optionally, the method may further include inputting identification information corresponding to a selected sign or sign holder with an input device; inputting identification information corresponding to a selected product with an input device; and transmitting the identification information corresponding to the selected sign or sign holder with the information corresponding to the selected product to the on-site processor, where the identification information corresponding to the selected sign or sign holder is associated with the identification information corresponding to the selected product by the on-site processor.

In this embodiment, the method may also optionally further include inputting identification information corresponding with a sign; transmitting the identification information to the on-site processor; and updating at least one of the signs based on the identification information. In this case, if the sign is a paper sign, the updating comprises transmitting from the on-site processor updated paper sign data to a printer, and if the sign is an electronic sign, the method includes transmitting, from the on-site processor, updated electronic sign data to the electronic sign. The paper sign data in this embodiment may include one or more of the following: (1) a paper sign type; (2) wording; (3) a retail store; (4) a department within a retail store; (5) a unique identifier associated with a product; (6) a date or dates that a sign should be displayed; (7) a time or times when a sign should be displayed; (8) a unique identifier associated with the paper sign; and (9) a unique identifier associated with a holder for the paper sign. The electronic sign data may include one or more of the following: (1) an electronic sign type; (2) wording; (3) a retail store; (4) a department within a retail store; (5) a unique identifier associated with a product; (6) the dates that a sign should be displayed; (7) the times when a sign should be displayed.

In this embodiment, the method may also optionally include determining whether it is time to change or update sign data for an associated product and, if it is determined that it is time to change or update the sign data for the associated product, displaying either a default message or changed or updated sign data on the electronic sign or paper sign corresponding to the associated product. Optionally, displaying the paper sign data includes sending the information to the printer.

In another embodiment, a method of managing content includes the following steps: (1) receiving electronic sign data pertaining to an electronic sign and a product; (2) receiving paper sign data pertaining to a paper sign and a product; (3) storing information pertaining to the electronic sign; (4) storing information pertaining to the paper sign; (5) transmitting the electronic sign data to an electronic display device; and (6) transmitting the paper sign data to a printer. Optionally, the method may further include receiving product data from an input device. Also optionally, the method may further include the following steps: receiving identification information corresponding to a selected sign or sign holder; receiving identification information corresponding to a selected product; and associating the identification information corresponding to the selected sign or sign holder with the identification information corresponding to the selected product. In this embodiment, the method may also optionally include determining whether it is time to change or update sign data for an associated product and, if it is determined that it is time to change or update the sign data for the associated product, transmitting either a default message or changed or updated sign data to the electronic display device or printer corresponding to the associated product.

In this embodiment, the sign data corresponding with the electronic or paper sign may include one or more of the following: (1) a sign type; (2) wording; (3) an identifier associated with a department within a retail store; (4) a unique identifier associated with a product; (5) the dates that a sign should be displayed; (6) the times when a sign should be displayed; (7) a unique identifier associated with the paper sign; and (8) a unique identifier associated with a holder for the paper sign. The information stored may include one or more of the following: (1) store identification; (2) sign location; (3) physical dimensions; (4) sign format; (5) paper sign identification; and (6) printer identification. The product data may include the type of product and/or inventory levels. Also, according to this embodiment, when the paper sign data is transmitted, the method may further include transmitting information identifying the location of the paper sign.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Figure 1:
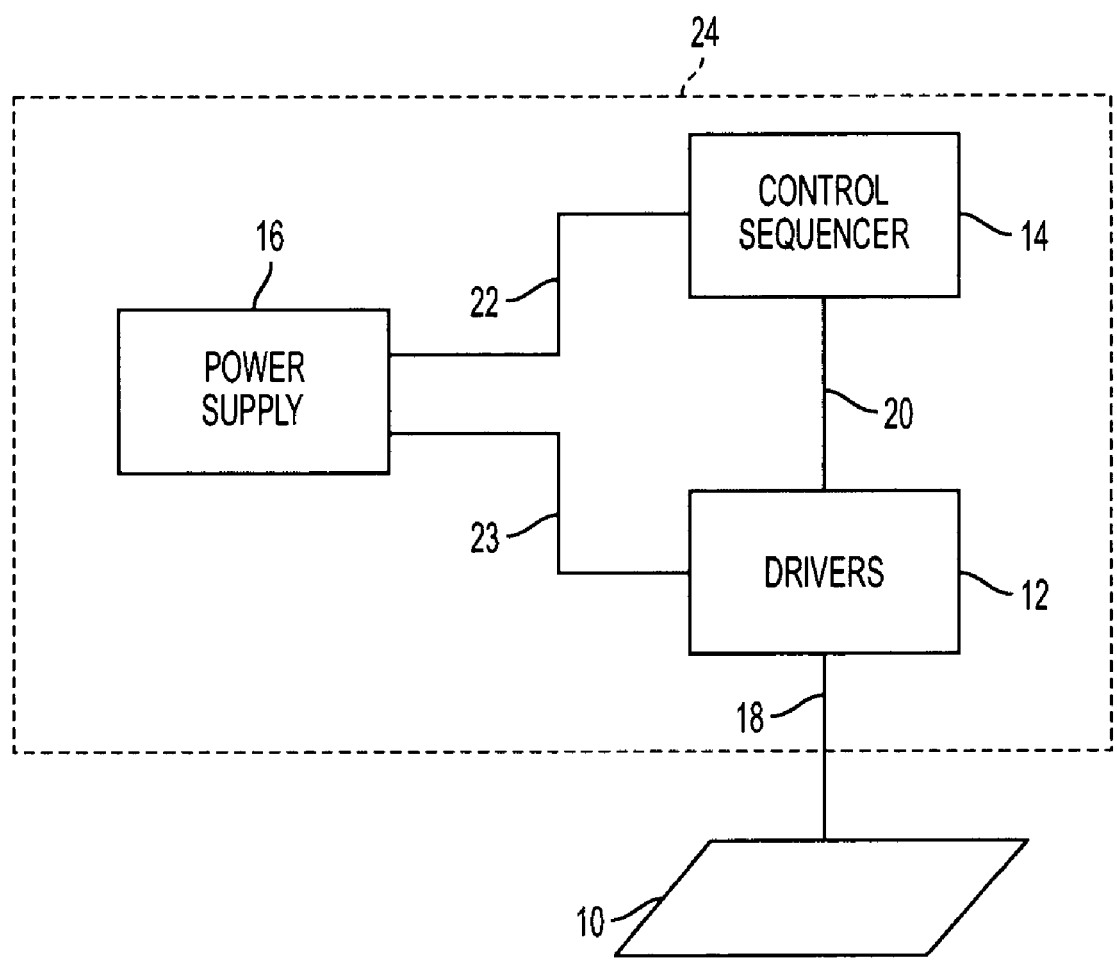
FIG. 1 is a block diagram showing exemplary components of a prior art display device.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "sign" is a reference to one or more physical signs and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

The disclosed embodiments relate to methods for coordinating merchandise promotions with electronic and paper signs. An electronic sign may include one or more electronic sign display devices ("ESDD"), such as segmented displays, all points addressable displays, bi-stable displays, active matrix displays, passive matrix displays, LCD displays, CRTs, SmartPaper™ based displays, or it may include non-SmartPaper™ based displays. A "paper" sign may include paper signs, cardboard, plastic, metal or other fixed print signs, other known non-electronic media and all equivalents thereof.

An example of an ESDD is described in U.S. Pat. No. 6,573,880, the disclosure of which is entirely incorporated herein by reference, in which the ESDD comprises a substrate and a conformable display media and control logic associated with the substrate. The display media has an input for receiving display information, and the control logic provides display information to the display media through the display media input. The system may also contain other elements which interact with the control logic and the display media such as sensors, speakers, buttons, lights and a interface for communicating with the control circuitry. Referring to FIG.

1, a core component to the system may be conformable, lightweight, low-power sheet-like display media 10. The display media 10 may be driven by control circuitry 24. The function of the control circuitry is to provide the voltage signals that generate the electric fields which cause image changes on the display media 10. The control circuitry may have an array of drivers 12, a control sequencer 14 and a power supply 16. The array of display drivers 12 may communicate directly with the display media 10 through an array of lines 18. The drivers 12 receive their driving information from the control sequencer 14 through an array of lines 20. The control sequencer 14 and the drivers 12 are both powered using a power supply 16 which provides power through the lines 22 and 23.

Other examples of ESDDs, their operational characteristics, and manufacture are described in U.S. Pat. No. 4,126,854 by Sheridon titled "Twisting Ball Panel Display" and issued Nov. 21, 1978; U.S. Pat. No. 5,604,027 by Sheridon titled "Some Uses of Microencapsulation For Electric Paper" and issued Feb. 18, 1997; U.S. Pat. No. 5,717,514 by Sheridon titled "Polychromal Segmented Balls For A Twisting Ball Display" and issued Feb. 10, 1998; U.S. Pat. No. 5,808,783 by Sheridon titled "High Reflectance Gyricon Display" and issued Sep. 15, 1998; U.S. Pat. No. 5,815,306 by Sheridon et al., titled "'Eggcrate' Substrate For A Twisting Ball Display" and issued Sep. 29, 1998; and U.S. Pat. No. 5,825,529 by Crowley titled "Gyricon Display With No Elastomer Substrate" and issued Oct. 20, 1998, the disclosures of which are all entirely incorporated herein by reference.

Figure 2:
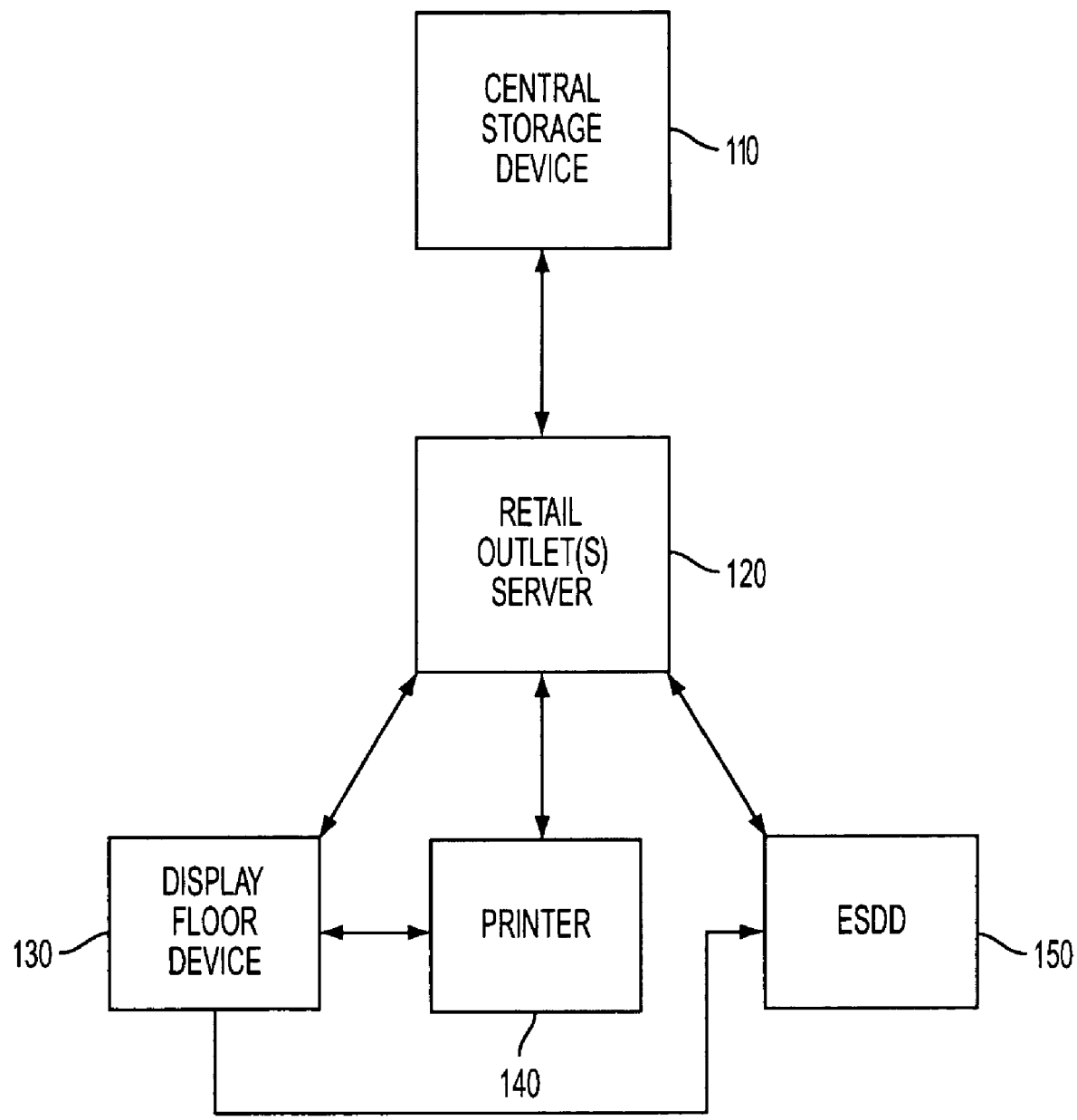
FIG. 2 is a block diagram of an exemplary embodiment including various components among a corporate headquarters, individual retail store locations and merchandise/product display locations on the floor.

FIG. 2 of the present application depicts a block diagram of an exemplary embodiment including a central storage device location, individual retail store server locations and merchandise/product display locations on the floor. Data relating to a sign or signs is stored at a central storage device 110 comprising, for example, a central processor, a computer-readable storage medium operably connected to the central processor, and a communications network operably connected to the central processor. The central storage device 110 may be located at one retail outlet, at a corporate headquarters, at a distribution center, at a third-party service provider or at another appropriate location.

The computer-readable storage medium contains program instructions that enable the central processor to manage the content to be displayed on the signs at one or more retail outlets or other sign locations. The management may be done by delivering the data to an on-site processor 120, such as a retail outlet server, for the preparation of signs at the retail outlet. The data may include, but is not limited to, one or more of the following: (1) an identification of each sign to be displayed; (2) the corresponding content, such wording and/or graphics to be displayed; (3) the type of sign; (4) the particular retail stores to be associated with each sign; (5) the particular department within a retail store to be associated with each sign; (6) the Stock Keeping Unit (SKU) or other identifier of the product(s) promoted with the sign; (7) the dates during which each sign should be displayed including; (8) the times during which each sign needs to be displayed; (9) and a default content display that is available to be displayed at any time. Optionally, some of this data may be stored and managed at a first location (such as an off-site server), while other data may be stored and managed at a second location (such as an on-site server). At particular intervals, the content may be changed via the program instructions to reflect a sale, clearance, final markdown, or other content changes that may be required.

At each retail outlet or other appropriate location, a server or on-site processor 120 operably connected to the communications network 120 communicates with the central storage device 110, receiving and storing the sign with its corresponding data. The retail outlet server 120 maintains specific information about each ESDD and/or paper sign that is associated with the retail outlet. For example, for each ESDD, the server 120 may store an identifier, location, and physical dimensions. For each paper sign, the server 120 may store sign or sign holder location, sign and sign holder format and physical dimensions, and printer identification information. The server 120 may communicate (i.e. receive and transmit data) with each ESDD 150 or printer 140 through a wired and/or wireless communication network. Each sign, whether it is a paper sign utilizing a paper sign holder or an ESDD, may be adapted for communication with the retail outlet server 120 by a scanning or other display floor device 130. The display floor device may be any input device utilizing wireless, wired, or another form of communication, such as a handheld or stand-alone scanning device utilizing a bar code, a radio frequency identification (RFID) tag or transponder (i.e., a small object, such as an adhesive sticker, that can be attached to or incorporated into a product, containing one or more antennae that enable receiving and responding to radio-frequency queries from an RFID transceiver), a personal digital assistant (PDA) (i.e. a small handheld computer, such as a Palm Pilot or pocket pc product), and/or a local computer processing unit (CPU). It should be noted that a scanning device does not necessarily require optical recognition, and may be any device where sign identification may be inputted. A wireless device may include any device that does not utilize a wired connection to the server, such as, for example, a wireless modem, a wireless router, or any form of light or infrared modulation. The display floor device may be used to scan or otherwise input a sign identifier (such as a serial number) and the product identifier or SKU, such that the server is able to associate a particular product with a corresponding sign and store this product/sign association information into the server memory.

The server 120 may update sign data depending on the information received from the display floor device 130 and/or the information received from the central storage unit 110. For example, the central server 110 may send a message to the retail outlet server 120 to change data on a particular sign or change data on all signs that are being used to display a particular product. If the instruction is to change a particular sign, the retail outlet server 120 may receive a sign identifier from the central server 110, and the retail outlet server may then communicate the update instruction either: (i) directly to the sign 150 if the sign is an ESDD, or (ii) to a printer 140 if the sign is a paper sign. If the instruction is to change one or more signs associated with a particular product, then the retail outlet server 120 may access its memory to determine which sign(s) is/are associated with that product. Once the associated signs are identified, the retail outlet server 120 may communicate the update to the associated sign 150 (if an ESDD) or a printer 140 (if a paper sign).

When delivering sign data to a printer 140, the printed sign may include identifying information that indicates where the paper sign should be placed. The information may be printed directly on the sign, or it may be printed on a cover page that precedes the sign on the printer, or it may be printed on a trailer page that follows the sign on the printer. The information may be a direct instruction of a sign location, or it may be an identification code that corresponds to a sign location, or it may be a bar code or identifier that can be scanned or otherwise inputted using a scanning or other input device 130 to determine the location, or it may be another identifier.

In some embodiments, the display floor device 130 may be used by a store associate to change the sign data and/or display while the associate is on the sales floor. The data may include, for example, data relating to products that are to be associated with a sign, inventory levels or other data. The display floor device 130 may transmit such information to the retail server 120. As an example, when placing new products on a display, the associate may use the display floor device to scan or otherwise input a sign identifier (such as a serial number) and the product identifier or SKU. The server is then able to associate a particular product with a corresponding sign, and may store this information into the server memory. In response, the retail server 120 may send updated sign information. In response, if the sign is an ESDD, the server 120 may automatically update the ESDD 150 after an initial sign/product association is established. If the sign is a paper sign, the server 120 may automatically send the updated sign to the appropriate printer 140 and automatically print the updated sign. This may allow a sales floor associate to update the display of a particular sign quickly and without unnecessary delay. In some embodiments, the display floor device may receive a message from the server 120 reflecting instructions to the store associate.

An example of a suitable printer 140 for some embodiments is described in U.S. Pat. No. 6,019,466, the disclosure of which is entirely incorporated herein by reference, in which there is provided a multicolor liquid ink printer for printing unmottled, high quality images on sheets of plain paper. The multicolor liquid ink printer includes a flat, generally rectangular stationary platen having a first long side, a second long side, a first short end, a second short end, and a sheet supporting surface for supporting a sheet of plain paper. The multicolor liquid ink printer also includes a heating device for heating the stationary platen, and a sheet containing and feeding assembly for containing and feeding sheets of plain paper onto the sheet supporting surface of the stationary platen. The multicolor liquid ink printer includes a bidirectionally movable sheet driving and printing assembly that is movable over and relative to the stationary platen and to a sheet being supported on the stationary platen. The sheet driving and printing assembly includes (i) a carriage; (ii) drive rollers mounted to the carriage for driving and moving a sheet on the stationary platen relative to the stationary platen, and (iii) a plurality of full width array printheads mounted to the carriage. Each full width array printhead of the plurality of full width array printheads contains a different color liquid ink for printing an unmottled, high quality liquid ink image onto a sheet of plain paper that is stationarily supported on the flat platen, thereby together forming an unmottled, high quality multicolor liquid ink image on the plain paper. Of course, other printers and printing devices may be used with the system and methods described herein, and the exemplary printer described above is for illustration purposes only.

Figure 3:
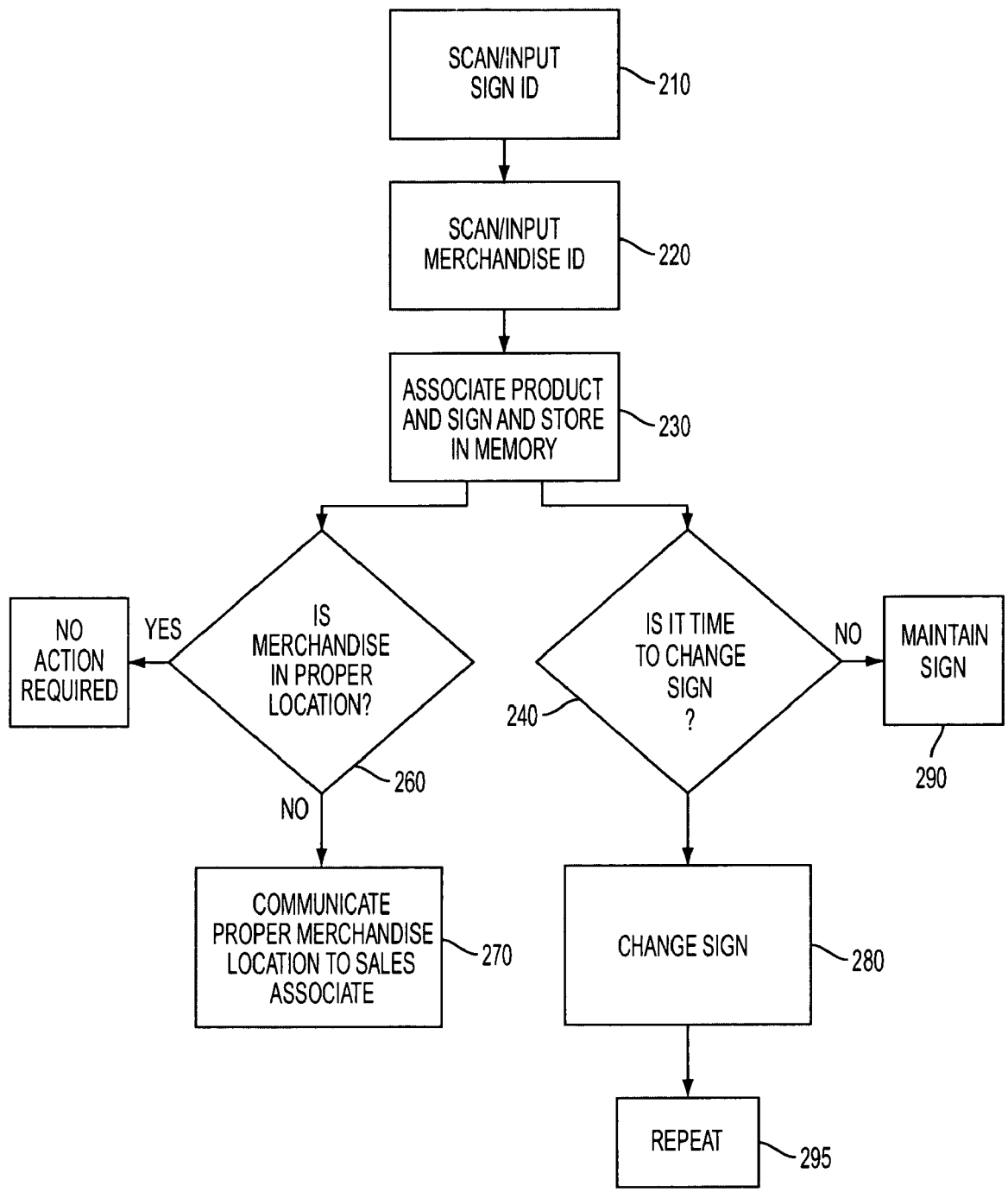
FIG. 3 is a flow diagram for an exemplary method of coordinating merchandise promotions with electronic signs.

As shown in FIG. 3, if an ESDD is available for the product associated with a particular identifier or SKU, a store associate or other person may use the display floor device to scan or input a unique identifier such as a serial number associated with the sign or a bar code located on the ESDD 210. The associate may also scan or input the SKU or other product identifier from the product or a product label or tag 220. This establishes the initial product/sign association, which may be stored into the server memory 230. Note that multiple SKUs may be associated with a sign, and multiple signs may be associated with a SKU. Thus, one or more ESDDs may be directly associated with one or more products. Alternatively, the product-ESDD association may be indirect, such as by establishing an association between: (i) a product and a location, such as a display shelf; and (ii) the location and the sign.

There may be a transition time when the server determines whether it is time to change or update an electronic sign 240. If the server determines that a sign is not ready to be changed or updated, the sign may be maintained as is 290. If the server determines that it is time to change a sign for a particular product (where the appropriate dates and/or times that a sign should be displayed may be stored in memory, such as would be the case if it were part of the initial sign data communicated to the server from the central storage device) 240, the server may communicate the corresponding changed or updated sign data to the ESDD, optionally via a proxy, to the sign identified by the display floor device, or it may communicate default data including a default message for display until the server is ready to change or update the sign data 280. The default message may be any data that is not specific to a particular product sale date or time such as, for example, a message regarding general product or store promotion, a store or product logo or slogan, an advertisement, a seasonal message such as "Happy New Year," a store map, or a blank screen. Optionally, the server may send updated information corresponding to all signs at one time. Depending on the format of data, the server may be able to dynamically format the sign to fit the ESDD. Note that there may be no input at all to the ESDD, whereby when the unique identifier is scanned or otherwise inputted, the inputted data may be delivered directly to the server so that the server may merely indicate the product location information.

Optionally, the server may be set to periodically (e.g., daily or hourly) check all ESDDs in the retail establishment to determine if the sign is being displayed during the correct date and/or time for a particular product and/or whether a sign is currently associated with one or more ESDDs, and then send the sign data to the appropriate ESDD(s) for automatic display 280. In this way, signs may be added to a retail environment quickly, and sign layouts throughout an entire store floor or retail environment may be quickly changed to meet the needs of a particular retailer, event or product cycle.

Also optionally, whenever an associate scans or otherwise inputs a product identifier or SKU, the server may determine whether the merchandise is in the correct location (i.e., located in the proper vicinity of the ESDD) 260. If it is not in the correct location, the server may communicate the correct location to the local display floor device or CPU and the sales associate will know immediately where to place the merchandise 270.

Figure 4:
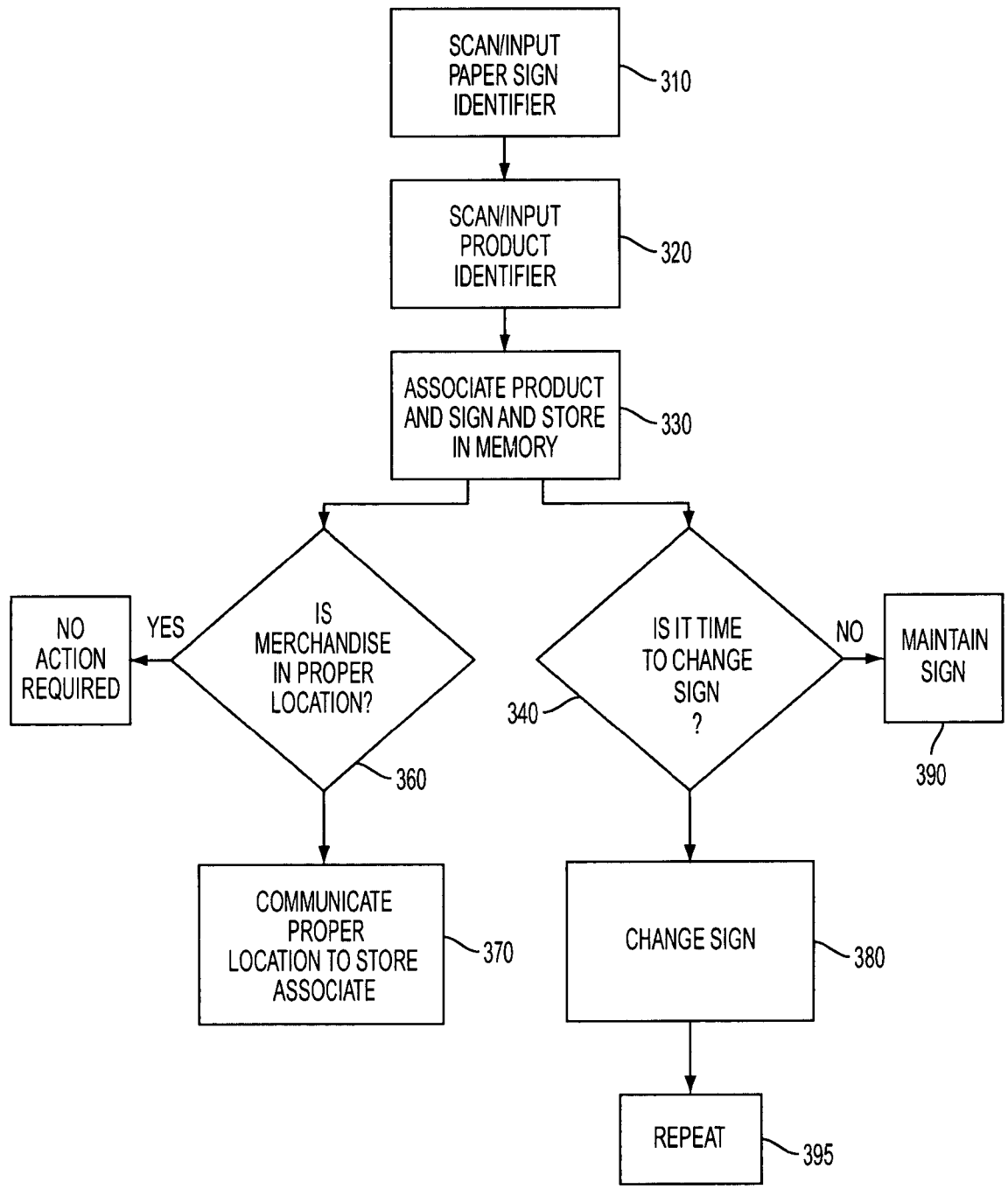
FIG. 4 is a flow diagram for an exemplary method of coordinating merchandise promotions with paper signs.

As shown in FIG. 4, if an ESDD is not available for a product and a paper sign is instead utilized, the retail outlet may use paper sign holders that are identifiable by a bar code, serial number, map, or other unique identifier. In addition, the paper sign itself may be identifiable by a bar code, serial number, or other unique identifier. The store associate may use the display floor device to scan or otherwise input the unique identifier associated with the sign or signholder 310, and scan or otherwise input the SKU or other identifier on the product 320. Alternatively, the store associate may input the unique identifier associated with the sign or signholder into a handheld device, keyboard or touch screen. This may establish the initial product/sign association, which may be stored in the server memory 330. Note that multiple SKUs or identifiers may be associated with a sign, and multiple signs may be associated with a particular SKU or identifier.

There may be a transition time when the server determines whether it is time to change or update a paper sign 340. For example, if the display floor device communicates or the server otherwise determines that the sign is missing from the appropriate sign holder, for the wrong merchandise, out of date, or displays other incorrect information, the server may communicate, optionally, via a proxy identified by the display floor device, the corresponding changed or updated sign data in the appropriate format for the corresponding sign holder to the printer or a local CPU associated with the particular sign holder 380, optionally with instructions for when to place the sign in the sign holder. Store associates may then pick up the printed sign and place the sign in the appropriate holder, minimizing the time required for store associates to individually determine whether new signs are needed or old signs must be replaced, and create and print the appropriate signs. If the server determines that a sign is not ready to be changed or updated, the sign may be maintained as is 390, or it may communicate default data including a default message for display until the server is ready to change or update the sign data. The default message may be any data that is not specific to a particular product sale date or time such as, for example, a message regarding general product or store promotion, a store or product logo or slogan, an advertisement, a seasonal message such as "Happy New Year," or a store map. Optionally, the server may send updated information corresponding to all signs at one time.

Additionally, whenever an associate scans or otherwise inputs a product SKU or identifier, the server may determine whether the product is in the correct location (i.e. located in the proper vicinity of the sign) 360. If it is not in the correct location, the server may communicate the correct location to the display floor device, printer, or local CPU so that the sales associate may know where to place the product 370 and/or sign.

Figure 5:
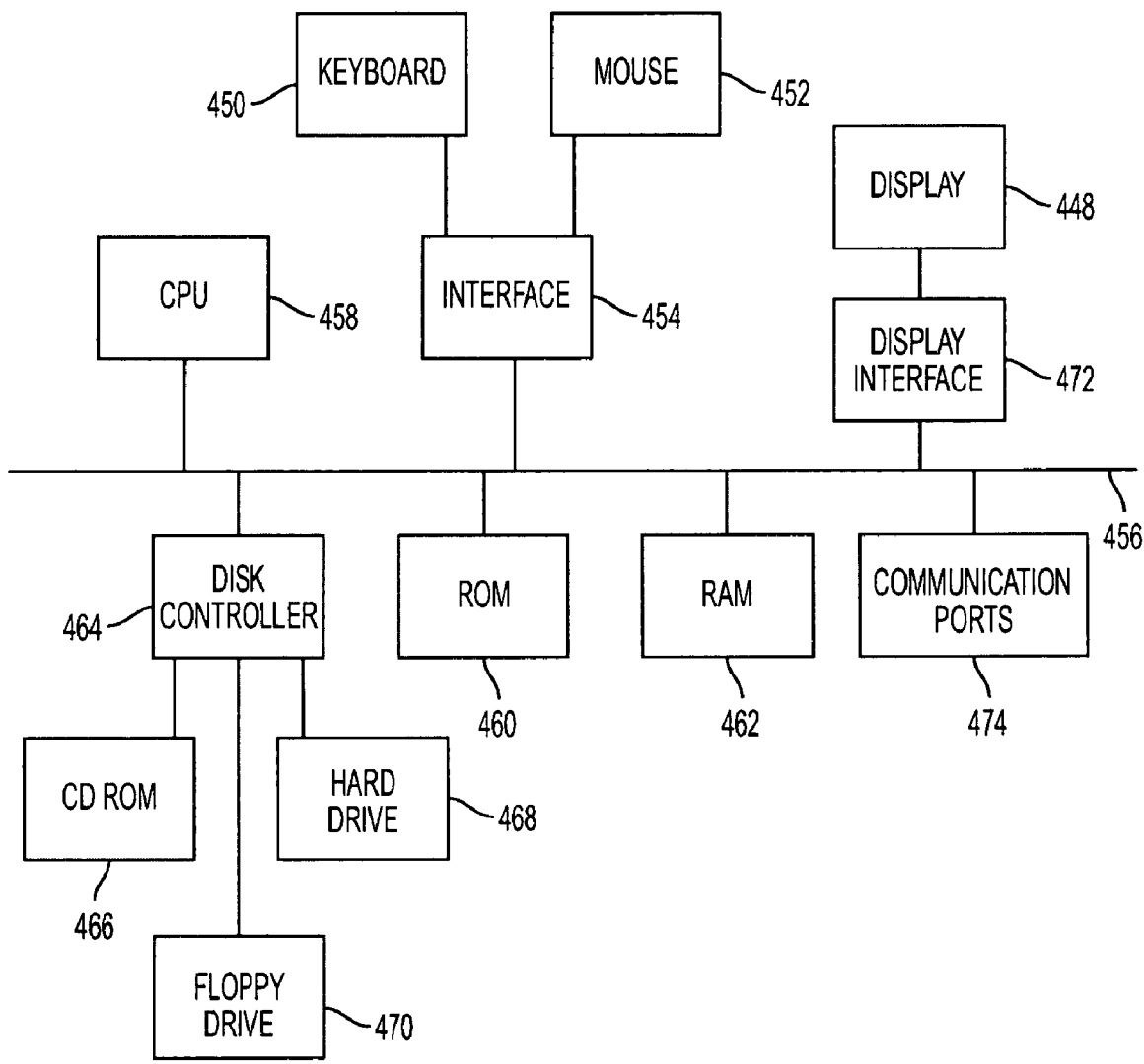
FIG. 5 is a block diagram of exemplary hardware that may be used to contain and/or implement the program instructions of a system embodiment.

FIG. 5 is a block diagram of exemplary hardware that may be used to contain and/or implement the program instructions of a system embodiment. Referring to FIG. 5, a bus 428 serves as an information highway interconnecting the other illustrated components of the hardware. CPU 402 is a central processing unit of the system, performing calculations and logic operations required to execute a program. Read only memory (ROM) 418 and random access memory (RAM) 420 constitute exemplary memory devices.

A disk controller 404 may interface with one or more optional disk drives to the system bus 428. These disk drives may be external or internal memory keys, zip drives, flash memory devices, floppy disk drives or other memory media such as 410, CD ROM drives 406, or external or internal hard drives 408. As indicated previously, these various disk drives and disk controllers are optional devices.

Program instructions may be stored in the ROM 418 and/or the RAM 420. Optionally, program instructions may be stored on a computer readable medium such as a floppy disk or a digital disk or other recording medium, a communications signal or a carrier wave.

An optional display interface 422 may permit information from the bus 428 to be displayed on the display 424 in audio, graphic or alphanumeric format. Communication with external devices may optionally occur using various communication ports 426. An exemplary communication port 426 may be attached to a communications network, such as the Internet or an intranet.

In addition to computer-type components, the hardware may also include an interface 412 which allows for receipt of data from input devices such as a keyboard 414 or other input device 416 such as a remote control, pointer and/or joystick. A display including touch-screen capability may also be an input device 416. An exemplary touch-screen display is disclosed in U.S. Pat. No. 4,821,029 to Logan et al., the disclosure of which is incorporated herein by reference in its entirety.

An embedded system may optionally be used to perform one, some or all of the operations of the methods described. Likewise, a multiprocessor system may optionally be used to perform one, some or all of the methods described.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for managing a network of electronic and paper signs, comprising:
    an on-site processor in communication with a central processor, at least one electronic display device and at least one printer;
    a portable input that transmits to the on-site processor a first identifier associated with one or more products and a second identifier associated with the paper sign;
    wherein the on-site processor implements program instructions to:
        receive, from the central processor, sign data;
        determine whether the sign data corresponds to an electronic display device, a paper sign, or both;
        if the data corresponds to an electronic sign, update the corresponding electronic display device; and
        if the data corresponds to a paper sign, print a corresponding paper sign on at least one of the printers.

2. The system of claim 1, wherein the sign data comprises one or more of the following:
    a sign type;
    sign wording;
    at least one retail store;
    at least one department within a retail store;
    the dates that a sign should be displayed; and
    the times when a sign should be displayed.

3. The system of claim 1, wherein the on-site processor stores information about each electronic and paper sign, the information comprising one or more of the following:
    store identification;
    sign location;
    physical dimensions;
    sign format;
    paper sign identification; and
    printer identification.

4. The system of claim 1, wherein the corresponding electronic display device includes a wireless communication device, and the on-site processor communicates with the corresponding electronic display device via its wireless communication device.

5. The system of claim 1, wherein the corresponding electronic display device includes a wired communication device, and the on-site processor communicates with the corresponding electronic display device via its wired communication device.

6. A method of managing content comprising:
    creating electronic sign data pertaining to at least one electronic sign and at least one product identifiable by a first identifier;
    creating paper sign data pertaining to at least one paper sign and at least one product identifiable by a second identifier;

inputting identification information corresponding to a selected sign or sign holder with an input device;

inputting identification information corresponding to a selected product with an input device;

transmitting at least a portion of the electronic sign data and at least a portion of the paper sign data to an on-site processor, wherein the on-site processor is operably connected to at least one electronic sign and operably connected to a printer associated with at least one paper sign;

transmitting the identification information corresponding to the selected sign or sign holder with the information corresponding to the selected product to the on-site processor, where the identification information corresponding to the selected sign or sign holder is associated with the identification information corresponding to the selected product by the on-site processor; and displaying the electronic sign data on the electronic sign and the paper sign data on the paper sign.

7. The method of claim 6, further comprising:
updating at least one of the signs based on the identification information corresponding to the selected sign;
wherein, if the sign is a paper sign, the updating comprises transmitting from the on-site processor updated paper sign data to a printer; and
wherein, if the sign is an electronic sign, the method includes transmitting, from the on-site processor, updated electronic sign data to the electronic sign.

8. The method of claim 6, wherein the paper sign data comprises one or more of the following:
a paper sign type;
wording;
at least one retail store;
at least one department within a retail store;
a date on which a sign should he displayed; and
a time when a sign should be displayed.

9. The method of claim 6, wherein the electronic sign data comprises one or more of the following:
an electronic sign type;
wording;
at least one retail store;
at least one department within a retail store;
a date on which a sign should be displayed; and
a time when a sign should be displayed.

10. The method of claim 6, further comprising:
determining whether it is time to change or update sign data for at least one of the associated products; and
displaying either a default message or changed or updated sign data on the electronic sign or paper sign corresponding to the associated product if the determining step determined that it is time to change or update the sign data for the associated product.

11. The method of claim 6, wherein displaying the paper sign data comprises sending the information to the printer.

12. A method of managing content comprising:
receiving electronic sign data pertaining to at least one electronic sign and at least one product;
receiving identification information corresponding to a selected sign or sign holder;
receiving paper sign data pertaining to at least one paper sign and at least one product;
receiving identification information corresponding to a selected product;
associating the identification information corresponding to the selected sign or sign holder with the identification information corresponding to the selected product;
storing information pertaining to the at least one electronic sign;
storing information pertaining to the at least one paper sign;
transmitting the electronic sign data to at least one electronic display device; and
transmitting the paper sign data to at least one printer.

13. The method of claim 12, further comprising receiving product data from an input device.

14. The method of claim 12, further comprising:
determining whether it is time to change or update sign data for at least one of the associated products; and
transmitting either a default message or changed or updated sign data to the electronic display device or printer corresponding to the associated product if the determining step determined that it is time to change or update the sign data for the associated product.

15. The method of claim 12, wherein the sign data corresponding with at least one of the electronic or paper signs comprises one or more of the following:
a sign type;
wording;
an identifier associated with at least one department within a retail store;
a date on which a sign should be displayed; and
a time when a sign should be displayed.

16. The method of claim 12, wherein the information stored comprises one or more of the following:
store identification;
sign location;
physical dimensions;
sign format;
paper sign identification; and
printer identification.

17. The method of claim 12, wherein the product data comprises one or more of the following:
type of product; and
inventory levels.

18. The method of claim 12, wherein transmitting the paper sign data includes transmitting information identifying the location of the paper sign.

* * * * *